US006981733B1

(12) United States Patent
Driscoll (10) Patent No.: US 6,981,733 B1
(45) Date of Patent: Jan. 3, 2006

(54) METHOD FOR BLOCKING GLARE FROM THE SUN

(76) Inventor: Valerie A. Driscoll, 7838 Sunny Vista Rd., Joshua Tree, CA (US) 92252

( * ) Notice: Subject to any disclaimer, the term of this patent is extended or adjusted under 35 U.S.C. 154(b) by 0 days.

(21) Appl. No.: 11/058,496

(22) Filed: Feb. 15, 2005

Related U.S. Application Data

(63) Continuation of application No. 10/625,976, filed on Jul. 24, 2003, now abandoned.

(51) Int. Cl.
 *B60J 3/00* (2006.01)
(52) U.S. Cl. .................................... 296/97.6; 296/97.9
(58) Field of Classification Search ............... 296/97.1, 296/97.5, 97.6, 97.7, 97.8, 97.9, 97.12, 97.13
 See application file for complete search history.

(56) References Cited

U.S. PATENT DOCUMENTS

| | | | | |
|---|---|---|---|---|
| 4,560,251 A * | 12/1985 | Murjahn | .................... | 359/608 |
| 4,570,991 A * | 2/1986 | Lystad | ........................ | 296/97.8 |
| 4,743,061 A * | 5/1988 | Pompa | ........................ | 296/152 |
| 4,746,162 A * | 5/1988 | Maness | ...................... | 296/152 |
| 4,818,011 A * | 4/1989 | Cherian | ..................... | 296/97.2 |
| 4,921,296 A * | 5/1990 | Gruber | ....................... | 296/97.2 |
| 5,033,786 A * | 7/1991 | Bickford | .................... | 296/97.9 |
| 5,292,168 A * | 3/1994 | Mykytiuk et al. | ......... | 296/97.8 |
| 5,362,119 A * | 11/1994 | Rosenratter | ............... | 296/97.8 |
| 5,538,310 A * | 7/1996 | Frankhouse et al. | ....... | 296/97.4 |
| 6,120,085 A * | 9/2000 | Wooldridge | ............... | 296/97.8 |
| 6,394,530 B1 * | 5/2002 | Bittner | ....................... | 296/152 |

* cited by examiner

Primary Examiner—H. Gutman
(74) Attorney, Agent, or Firm—Ted Masters

(57) ABSTRACT

In a motor vehicle, a method and apparatus for blocking glare from the sun includes a sun shield which is positioned to block the glare. The sun shield has a connector for attaching the sun shield to the vehicle, and has a plurality of rotationally positionable blades. The sun shield is attached to the vehicle, and one or more of the blades is rotated to block the glare. The sun shield may be attached to the vehicle's visor, to the side window, or between the side window and the window weather stripping.

4 Claims, 10 Drawing Sheets

Fig_14

Fig_15

Fig. 16

METHOD FOR BLOCKING GLARE FROM THE SUN

CROSS REFERENCE TO RELATED APPLICATION

This application is a Continuation of application Ser. No. 10/625,976, filed Jul. 24, 2003 now abandoned, and which is included herein by reference.

TECHNICAL FIELD

The present invention pertains generally to motor vehicles, and more particularly to a method and apparatus for blocking the glare of the sun by interposing a sun shield between the glare and an occupant of the vehicle.

BACKGROUND OF THE INVENTION

Drivers are sometimes bothered by the glare of the sun, particularly when the sun is low upon the horizon such as occurs at dawn and dusk. At these times the sun can shine directly into the driver's eyes thereby creating a hazardous driving condition which cannot always be alleviated by employing the vehicle sun visor. The glare can come directly from the sun, or from reflections off of the drivers vehicle or the roadway.

Devices for shielding a driver from sun glare are known in the art. For example, U.S. Pat. No. 1,489,407 shows an adjustable glare shield. The shield includes a plurality of segmental shield members.

U.S. Pat. No. 1,613,364 illustrates a glareshield which is arranged in a foldable fanlike structure.

U.S. Pat. No. 1,617,981 discloses a glareshield for motor vehicles. The glareshield includes a plurality of panels.

U.S. Pat. No. 4,090,733 comprises a glare eliminating device for vehicles which includes a flat support arm, a flat shielding portion of an opaque material to effectively block objectionable glare of the sun or lights from oncoming vehicles coupled with a mounting means of a resilient material formed as a one piece member having a bight portion interconnecting a pair of legs with gripping ribs or flanges formed to securely grip any automobile visor, the component parts providing superior storage capability.

U.S. Pat. No. 4,570,991 discloses an elongated sun visor panel of either opaque or tinted material which is pivoted on the vehicle body adjacent the juncture between the windshield pillar and the windshield header to enable pivotal movement between a vertical stored position overlying the windshield pillar and a horizontal position partially obstructing either the windshield opening or the side window opening. The elongated panel is preferably divided by a living hinge which provides a longitudinal extending hinge axis by which the panel may be folded to closely overlie the shape of the windshield pillar. A pair of such sun visor panels are preferably provided to enable simultaneous shielding of the occupant relative both the windshield and the side window. The sun visor panel is preferably held in the use position and the stored position by Velcro fasteners, magnets, or a detent associated with the pivot.

U.S. Pat. No. 4,614,375 consists of a sun visor which is stowed on a pillar. The sun visor includes a pivot link which is mounted generally vertically on the pillar and has a plurality of pivot means vertically spaced along the length thereof. A plurality of generally rectangular sunshade links, each with a width not greater than the width of the pillar, have first ends which are connected to the pivot means on the pivot link. The plurality of sunshade links also have second ends which are pivotally connected to an end connector link by plurality of pivot means spaced along the length of the end connector link. The sun visor has a use position in which the plurality of sunshade links extend horizontally parallel with the windshield header and in parallel side-by-side relationship with another to provide a sun visor of substantial dimension to shield the occupant's eyes. By pivoting the sun visor links downwardly, the sunshade links are maintained in parallel side-by-side relationship with one another but stack one upon another in overlying relationship to provide a stored position of the sun visor in parallel overlying relationship with the windshield pillar.

U.S. Pat. No. 4,921,296 depicts a glare screen device for vehicle side door exterior mirror. The device includes a lower mount (36) having a lower tapered end (38) that is inserted between the door window and the door and as also having an upper end that projects upwardly with an inner surface that mounts a glare screen (46) of a sheet-like construction having a sufficient size and shape to screen light glare from an associated exterior door mirror. The lower end (38) of the lower mount (36) preferably has a taper (54) that facilitates its insertion and also preferably has a generally pointed construction (56). Glare screen (46) also preferably has inclined edges (58) that facilitate its positioning and has a horizontally elongated shape that is preferably oblong. A transparent tinted plastic is preferably utilized to fabricate the glare screen (46). In one embodiment, a bonded connection (68) secures the upper end (40) of the lower mount (36) to the glare screen (46) when a two-piece construction is utilized, and, in another embodiment, the lower mount (36) and glare screen (46) are injection molded with an integral, one-piece construction. The lower mount (36) is preferably provided with surface texturing (70) that holds the glare screen device in position.

U.S. Pat. No. 5,611,591 is directed to a supplemental visor having sets of U-shaped clips with an elastic strap joining the clips of each set for biased attachment to the opposite edges of a vehicle sun visor. Clips of each set include a sleeve shaped member which receives a hinge pin integral with a translucent glare shield. The hinge pin carries an elastomeric material to ensure adequate frictional engagement with the sleeve shaped members. The glare shield is of a suitable translucent material such as a material responsive to different amounts of light.

U.S. Pat. No. 6,086,132 illustrates a sun spot for use as an extension on a vehicle visor of a vehicle where the vehicle visor has a peripheral edge and the vehicle has an interior roof surface and a windshield. The sun spot comprises: a resiliently flexible injection molded shield member of unibody construction having a clip mechanism for adjusting and removing placement of the sun spot along the peripheral edge of the vehicle visor in approximate alignment with a longitudinal axis of the resiliently flexible injection molded shield member. The resiliently flexible injection molded shield member is sized and proportioned for shielding glare without impairing visibility through the windshield and the resiliently flexible injection molded shield member is retainable on the vehicle visor while flexing for comforming with the placement of the vehicle visor against the interior roof surface or the windshield. The resiliently flexible injection molded shield member is constructed for performing under temperature variations without materially failing.

BRIEF SUMMARY OF THE INVENTION

The present invention is directed to a method and apparatus for blocking glare from the sun in a motor vehicle such as an automobile, truck, SUV, and the like. A sun shield is attached to a convenient part of the vehicle such as the visor (also known as sun visor) or side window. The sun shield has a plurality of blades which can be selectively rotated by the occupant of the vehicle to block glare from the sun. Glare can be blocked from the eyes of the occupant, or from other body parts such as arms, hands, legs, etc. The present invention can be used to block glare impinging upon the driver of the vehicle, or upon a passenger of the vehicle.

In accordance with a preferred embodiment of the invention, a method for the occupant of a vehicle to block glare from the sun includes:

(a) providing a vehicle having a visor;
(b) providing a sun shield which is attachable to the visor of the vehicle, the sun shield including:
   a clamp for selectively attaching the sun shield to a desired location on the visor of the vehicle;
   a swivel attached to the clamp;
   a plurality of blades pivotally attached to the swivel, wherein each of the plurality of blades is rotationally positionable about the swivel;
   the plurality of blades including (1) blades of different lengths, and (2) blades of different widths;
(c) the occupant using the clamp to attach the sun shield to a desired location on the visor of the vehicle;
(d) the occupant selecting one blade from the plurality of blades, wherein the selection is made so that the length and width of the selected blade will both (1) block glare from the sun, and (2) minimize an amount of viewing obstruction presented to the occupant by the selected blade; and,
(e) the occupant rotating the selected blade so that the selected blade blocks glare from the sun.

In accordance with an aspect of the invention:
in (b), the plurality of blades including five blades as follows:
   a first blade having a length $L1$ and a width $W1$;
   a second blade having a length $L2$ and a width $W1$;
   a third blade having a length $L3$ and a width $W2$;
   a fourth blade having a length $L4$ and a width $W3$;
   a fifth blade having a length $L5$ and a width $W3$;
   wherein $L1<L2<L3<L4<L5$, and $W1<W2<W3$;
in (b), the five blades each having a racetrack shape; and,
in (d), the selecting including choosing one of (1) the first blade, (2) the second blade, (3) the third blade, (4) the fourth blade, and (5) the fifth blade.

In accordance with an aspect of the invention:
in (b), $L1$ being about eight inches, $L5$ being about 13 inches, $W1$ being about three inches, and $W3$ being about four inches.

In accordance with another preferred embodiment of the invention, a method for the occupant of a vehicle to block glare from the sun includes:

(a) providing a vehicle having a visor which is selectively positionable to a lowered position, the visor having a proximal edge having a length, and a distal edge;
(b) providing a sun shield which is attachable to the visor of the vehicle, the sun shield including:
   a clamp for selectively attaching the sun shield to a desired location on the visor of the vehicle;
   a swivel attached to the clamp;
   a plurality of blades pivotally attached to the swivel, wherein each of the plurality of blades is rotationally positionable about the swivel;
   the plurality of blades including (1) blades of different lengths, and (2) blades of different widths;
(c) the occupant placing the visor in the lowered position;
(d) the occupant using the clamp to attach the sun shield to a desired location along the length of the proximal edge of the visor;
(e) the occupant selecting one blade from the plurality of blades, wherein the selection is made so that the length and width of the selected blade will both (1) block glare from the sun, and (2) minimize an amount of viewing obstruction presented to the occupant by the selected blade; and,
(f) the occupant rotating the selected blade so that the selected blade extends beyond the distal edge of the visor and blocks glare from the sun.

In accordance with an aspect of the invention:
in (b), the plurality of blades including five blades as follows:
   a first blade having a length $L1$ and a width $W1$;
   a second blade having a length $L2$ and a width $W1$;
   a third blade having a length $L3$ and a width $W2$;
   a fourth blade having a length $L4$ and a width $W3$;
   a fifth blade having a length $L5$ and a width $W3$;
   wherein $L1<L2<L3<L4<L5$, and $W1<W2<W3$;
in (b), the five blades each having a racetrack shape; and,
in (e), the selecting including choosing one of (1) the first blade, (2) the second blade, (3) the third blade, (4) the fourth blade, and (5) the fifth blade.

In accordance with another aspect of the invention:
in (b), $L1$ being about eight inches, $L5$ being about 13 inches, $W1$ being about three inches, and $W3$ being about four inches.

In accordance with another preferred embodiment of the invention, a method for the occupant of a vehicle to block glare from the sun includes:

(a) providing a vehicle having a side window and cooperating weather-stripping;
(b) providing a sun shield including:
   a clamp for selectively attaching the sun shield to a desired location on the vehicle;
   a swivel attached to the clamp;
   a plurality of blades pivotally attached to the swivel, wherein each of the plurality of blades is rotationally positionable about the swivel;
   the plurality of blades including (1) blades of different lengths, and (2) blades of different widths;
(c) the occupant selecting at least one anchor blade from the plurality of blades and inserting the at least one anchor blade between the side window and the weather-stripping so that the at least one anchor blade is fixedly captured therebetween;
(d) the occupant selecting a blocking blade from the plurality of blades, wherein the selection is made so that the length and width of the blocking blade will both (1) block glare from the sun, and (2) minimize an amount of viewing obstruction presented to the occupant by the blocking blade; and,
(e) the occupant rotating the blocking blade so that the blocking blade blocks glare from the sun.

In accordance with an aspect of the invention:
in (b), the plurality of blades including five blades as follows:
   a first blade having a length $L1$ and a width $W1$;
   a second blade having a length $L2$ and a width $W1$;

a third blade having a length L3 and a width W2;
a fourth blade having a length L4 and a width W3;
a fifth blade having a length L5 and a width W3;
wherein L1<L2<L3<L4<L5, and W1<W2<W3;
in (b), the five blades each having a racetrack shape;
in (c), the selecting including choosing at least one of (1) the first blade, (2) the second blade, (3) the third blade, (4) the fourth blade, and (5) the fifth blade; and,
in (d), the selecting including choosing one of (1) the first blade, (2) the second blade, (3) the third blade, (4) the fourth blade, and (5) the fifth blade, wherein the at least one blade that was selected in (c) cannot be selected in (d).

In accordance with an aspect of the invention:
in (b), L1 being about eight inches, L5 being about 13 inches, W1 being about three inches, and W3 being about four inches.

In accordance with and aspect of the invention:
in (c), selecting four anchor blades 28, and inserting all four selected anchor blades 28 between side window 504 and weather-stripping 508.

Other aspects of the present invention will become apparent from the following detailed description, taken in conjunction with the accompanying drawings, which illustrate, by way of example, the principles of the invention.

DETAILED DESCRIPTION OF THE INVENTION

Figures 1, 2:
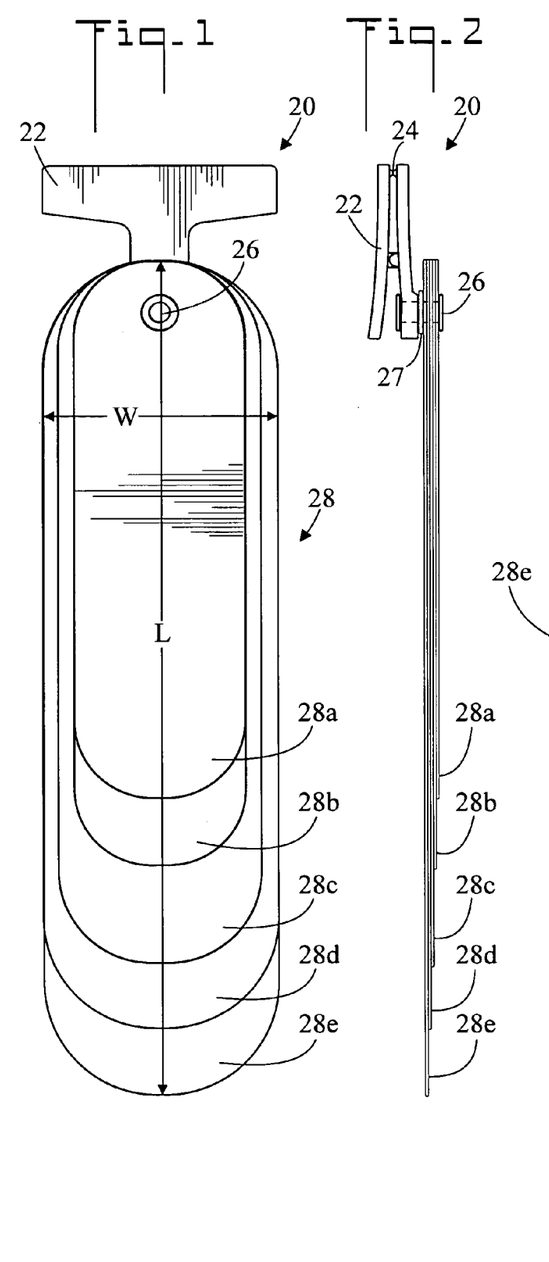
FIG. 1 is a front elevation view of a sun shield which is attachable to a vehicle for blocking glare from the sun in accordance with the present invention.
FIG. 2 is a side elevation view of the sun shield.
Figure 3:
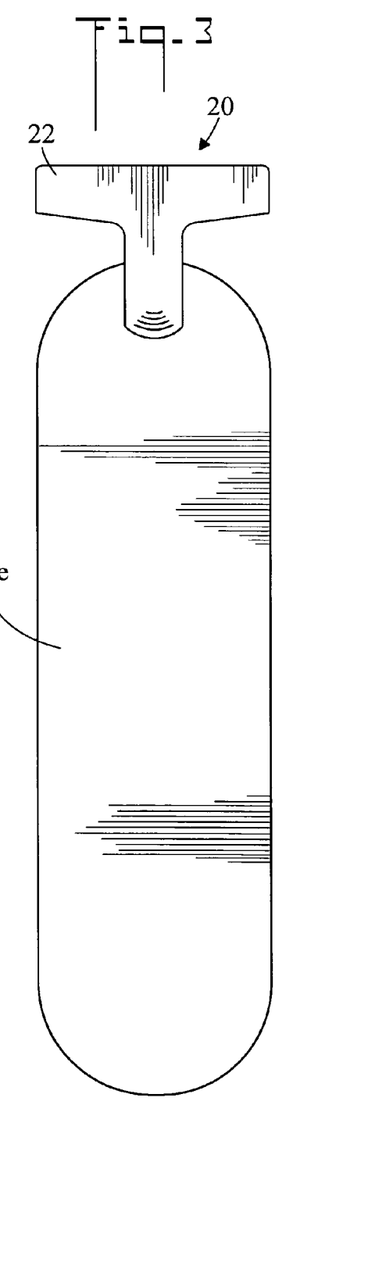
FIG. 3 is a rear elevation view of the sun shield.

Referring initially to FIGS. 1–3, there are illustrated front elevation, side elevation, and rear elevation views respectively of a sun shield which is attachable to a vehicle for blocking glare from the sun in accordance with the present invention, the sun shield generally designated as 20. As defined herein glare from the sun can include light received directly from the sun, or sun light which is reflected off of an object such as an occupant's vehicle, another vehicle, or a stationary object such as a roadway or body of water. Additionally, the present invention can be used to block glare from a vehicle occupant's eyes, or from other body parts such as an arm, hand, leg, or face.

Sun shield 20 includes a connector 22 for selectively attaching sun shield 20 to the vehicle 500 (also refer to FIGS. 5, 10, 11, and 13). Connector 22 may be any device which is sufficient to attach sun shield 20 to a part of the vehicle (such as a visor 502, also known as a sun visor) (refer to FIG. 5), or to a side window 504 (refer to FIG. 10). In the shown embodiment connector 22 is a spring clamp, however other connectors having prongs, hinges, hook and loop fasteners, adhesive, etc. could also be employed. In the shown embodiment, connector 22 includes a cushioning material 24 disposed in the jaws of connector 22 to minimize any impressions which might be made upon the visor 502 of the vehicle 500. Also, when not in use, sun shield 20 may left attached to vehicle 500 (refer to FIG. 15), or alternatively may be stored within vehicle 500 and installed on an ad hoc basis.

A swivel 26 is attached to connector 22. Swivel 26 provides an axis about which a plurality of blades 28a through 28e may rotate. Swivel 26 may be a rivet (shown), screw and nut, bolt, post, pin axle, or any other member about which blades 28 may rotate. Plurality of blades 28 are pivotally attached to swivel 26, wherein each of the blades 28 is rotationally positionable about swivel 26 (also refer to FIG. 4). That is, each of blades 28 is independently movable about swivel 26. The shown embodiment includes five blades 28a–28e, however it may be appreciated that other numbers of blades 28 could also be utilized, for example four or seven. Blades 28 are pressed together by swivel 26 so that friction will hold a blade 28 in a selected rotational position. One way of obtaining the friction effect is through the use of a resilient washer 27. In the shown embodiment, blades 28 have a "racetrack" shape (having rounded ends and a straight mid portion), however other blade shapes could also be used. The rounded ends of the racetrack shape have the advantage of blocking the circular contour of the sun, and doing so with the least viewing obstruction to the occupant of the vehicle. Blades 28 may be translucent, translucent coated with a ultra-violet light blocking material, or opaque. Blades 28 may be fabricated from plastic, wood, a wood byproduct, or other ridged or semi-ridged material. In an embodiment of the invention, blades 28 are flexible so that they can conform to the interior surface of vehicle 500.

The plurality of blades 28 includes blades 28 having different lengths and having different widths. The different blade 28 lengths and blade 28 widths allows the occupant of the vehicle 500 to optimize the placement of blade 28 with respect to the direction and amount of glare. That is, a blade 28 may be selected such that the selected blade 28 will minimize the amount of viewing obstruction present to the occupant of the vehicle 500 and will still block glare 600 (also refer to FIGS. 5 and 9 and the related discussions). In another embodiment of the invention, some of blades 28 have the same width.

In an embodiment of the invention, the plurality of blades 28 are arranged in order from shortest to longest. This is so that when sun shield 20 is installed on the vehicle, access to the shortest blade 28a is not blocked by the larger blades 28.

Also, the size of blades 28 can vary. In the shown embodiment the longest blade 28e is about 13 inches long (L), and the shortest blade 28a is about 8 inches long, and the widest blades 28e and 28d are about four inches wide (W) and the narrowest blades 28a and 28b are about three inches wide. These specific lengths and widths have been found very useful in affording the occupant the capability to select a blade 28 which both block the glare 600 from the sun and also to presents the minimum viewing obstruction. It is also noted that if swivel 26 can be disassembled (such as a bolt and nut), blades 28 may be added to or removed from sun shield 20.

Figure 4:
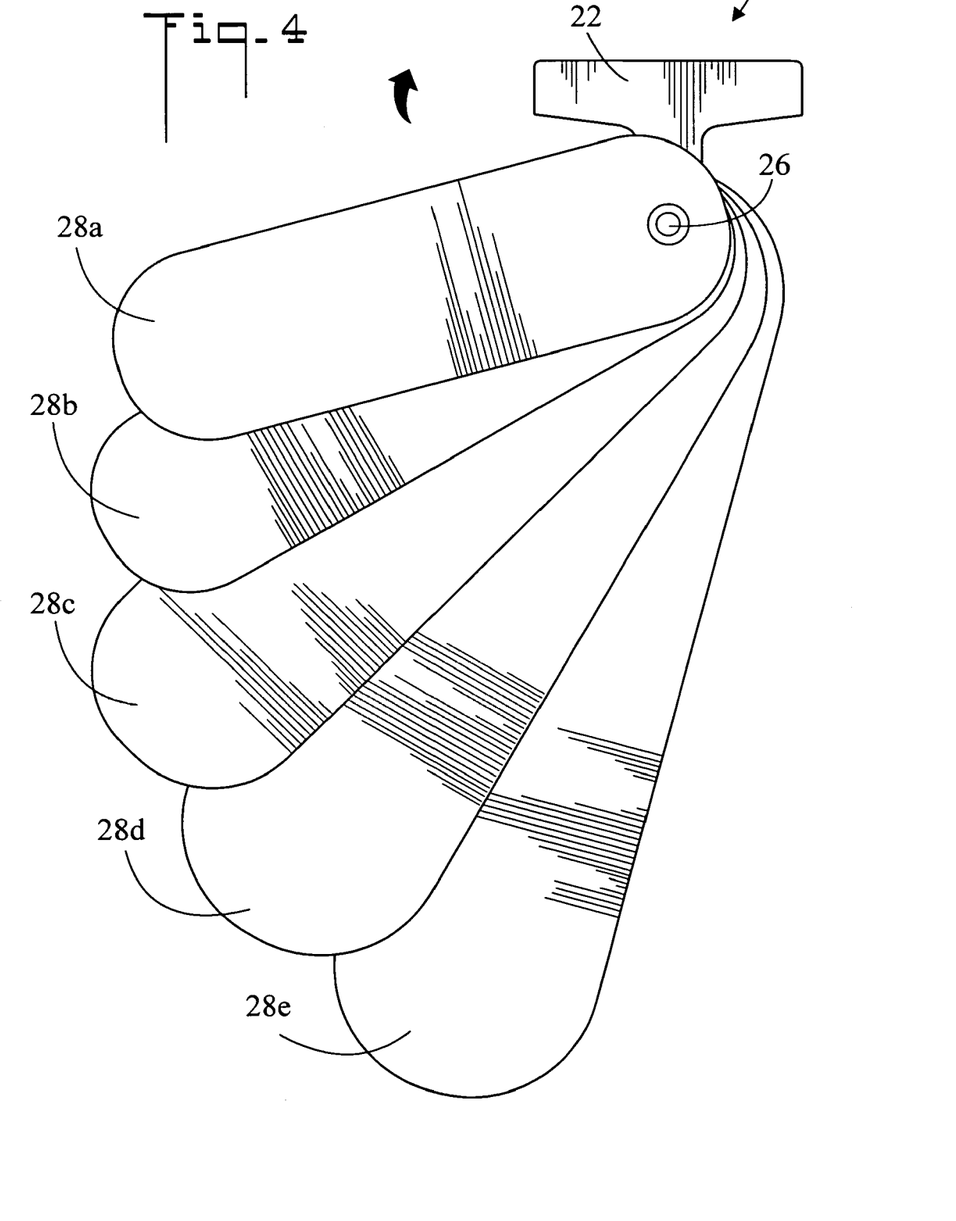
FIG. 4 is a front elevation view of the sun shield shown in a "fanned" configuration.

FIG. 4 is a front elevation view of sun shield 20 in a "fanned" configuration. Blades 28a through 28e have been rotated to different positions about swivel 26, and will remain in their rotated position.

Figure 5:
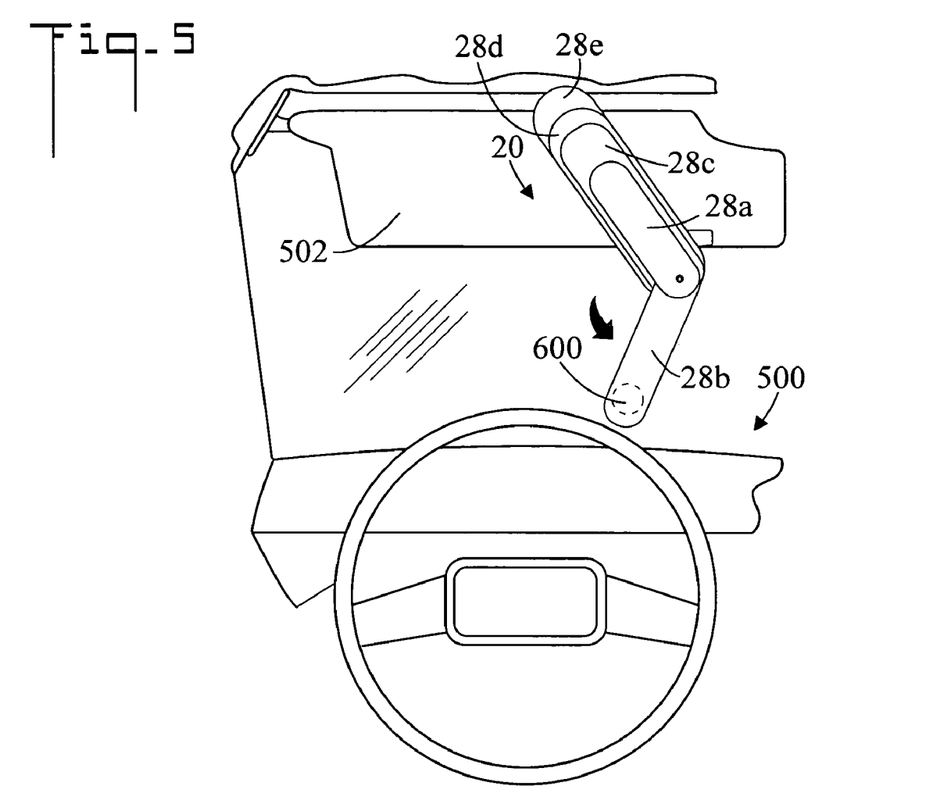
FIG. 5 is a reduced front elevation view of the sun shield attached to the visor of a vehicle.

FIG. 5 is a reduced front elevation view of sun shield 20 attached to visor 502 of vehicle 500. Visor 502 is in a forward position adjacent to the windshield of vehicle 500. In the shown embodiment of the present invention, connector 22 of sun shield 20 has been attached to the lower edge of visor 502. It may be appreciated however, that connector 22 could also be attached to the top (refer to FIG. 9) or side of visor 502. One blade 28b, has been rotated to block glare 600 from the sun. That is, blade 28b has been rotated so that it is interposed between the glare source 600 and the eyes of an occupant (driver) of vehicle 500, thereby blocking the glare 600 so that the occupant may look in the direction of the glare 600 without being blinded. It is noted that care has been taken in selecting which blade 28 is to be rotated. A blade 28b was selected which has a length and width which will minimize the amount of viewing obstruction presented to the occupant of the vehicle 500. For example, blades 28c, 28d, and 28e, would also serve to block the glare 600, however these blades would present a larger viewing obstruction to the occupant of the vehicle 500. Conversely, blade 28a is too short and would not fully block glare 600.

Figure 6:
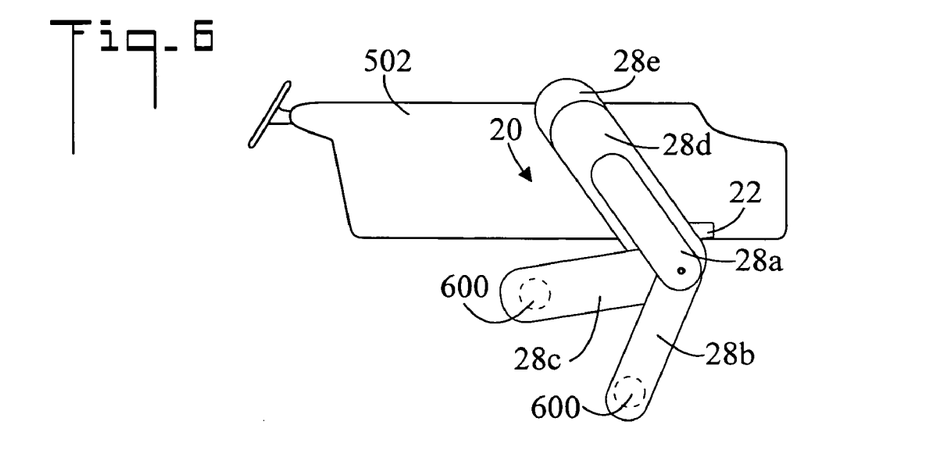
FIG. 6 is a reduced front elevation view showing two blades being utilized to block two sources of glare.

FIG. 6 is a reduced front elevation view showing two rotated blades 28 being utilized to block two sources of glare 600, such as from the sun directly and from a reflection off of the hood of vehicle 500. The two blades 28 are in different rotational positions in order to block the two sources of glare 600. Blades 28b and 28c have been selected so as to minimized the viewing obstruction presented to the occupant of vehicle 500.

Figure 7:
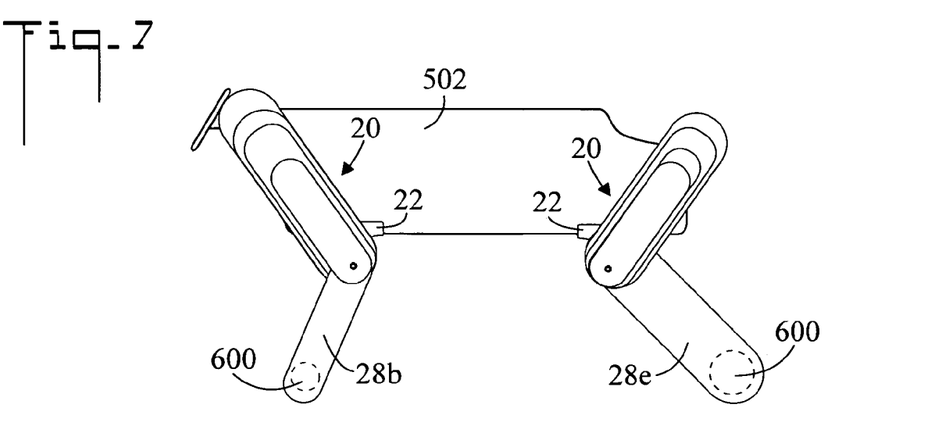
FIG. 7 is a reduced front elevation view showing two sun shields attached to the visor.

FIG. 7 is a reduced front elevation view showing two sun shields 20 attached to visor 502. In this instance, the two sources of glare 600 are separated such that two blades 28 from one sun shield 20 could not block both sources of glare 600, therefore two sun shields 20 are required. It may be appreciated that more than two sun shields 20 could also be employed.

Figure 8:
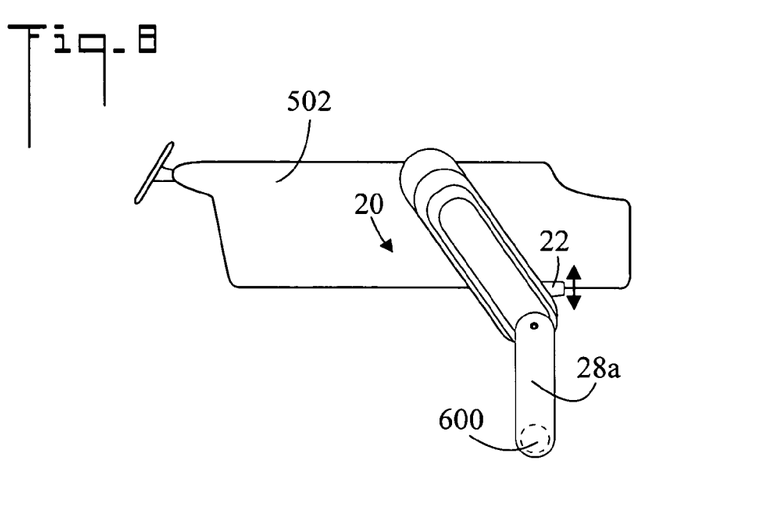
FIG. 8 is a reduced front elevation view showing the sun shield being selectively positioned on the visor.

FIG. 8 is a reduced front elevation view showing sun shield 20 being selectively positioned on visor 500. Connector 22 may be moved vertically up or down to effect an adjustment in the area blocked by blades 28. For example, if blade 28a was not quite long enough to block glare 600, the position of connector 22 on visor 502 could be adjusted downward vertically to result in complete glare blocking 600.

Figure 9:
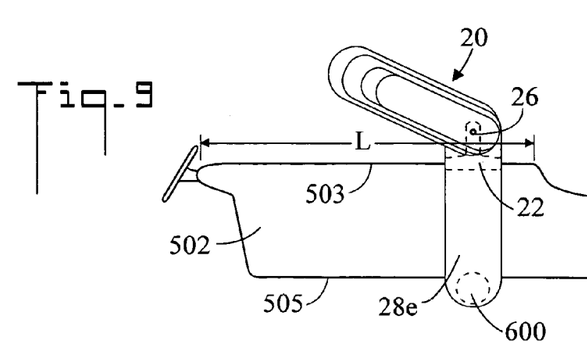
FIG. 9 is a reduced front elevation view showing the sun shield attached to the top of the visor.

FIG. 9 is a reduced front elevation view showing sun shield 20 attached to the top of lowered visor 502. Visor 502 has a proximal edge 503 having a length L, and a distal edge 505. This configuration is useful if the source of glare 600 extends just below the lowered visor 502. Blade 28e may be rotated to block the glare 600 and present a minimal viewing obstruction to the occupant of vehicle 500.

Figure 10:
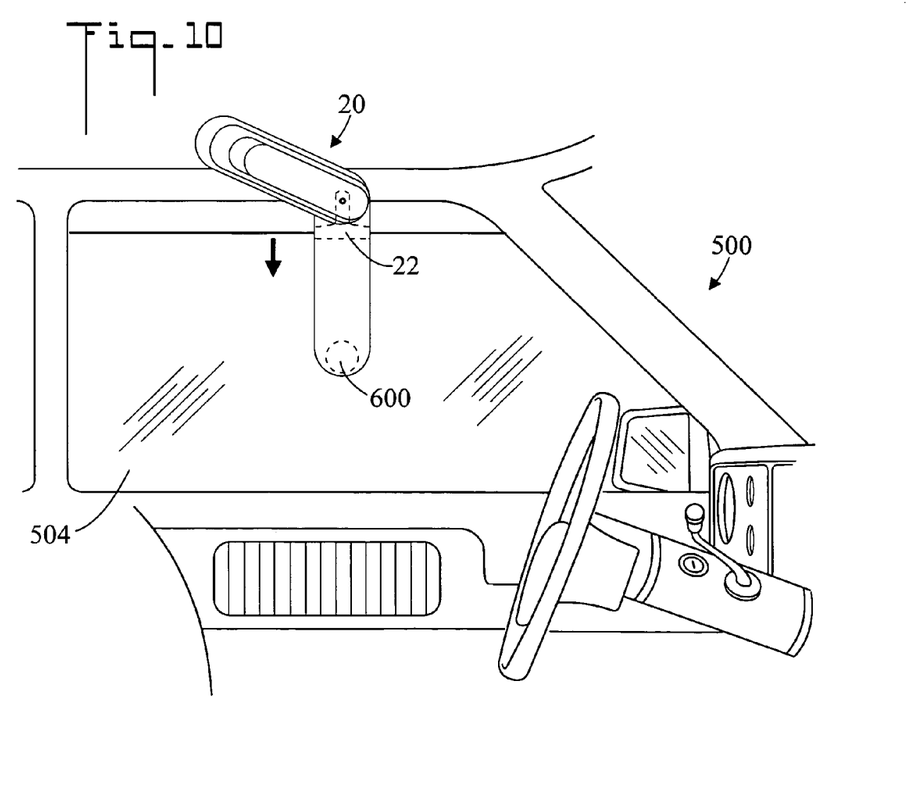
FIG. 10 is a reduced side elevation view of the sun shield attached to the top of a side window.

FIG. 10 is a reduced side elevation view of sun shield 20 attached to the top of a side window 504 which has been rolled down slightly. In this position, sun shield 20 blocks glare 600 coming from the side of the occupant.

Figure 11:
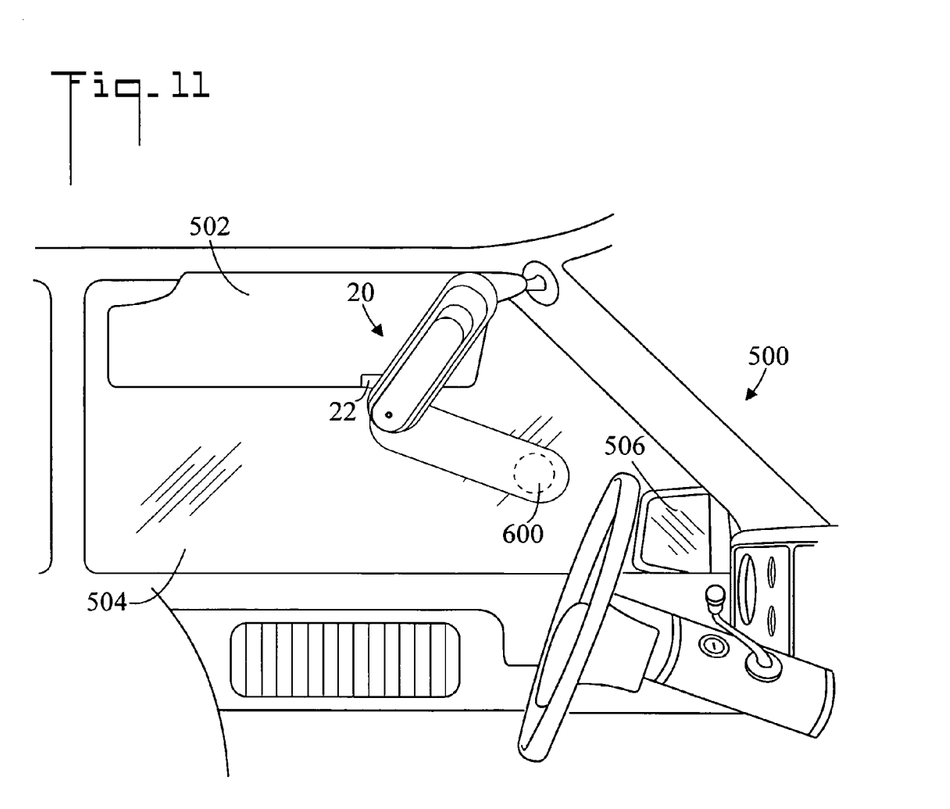
FIG. 11 is a reduced side elevation view of the sun shield attached to the visor which has been moved to a side position.

FIG. 11 is a reduced side elevation view of sun shield 20 attached to visor 502 which has been moved to a side position. In this position, sun shield 20 is useful in blocking glare 600 from a side view mirror 506.

Figure 12:
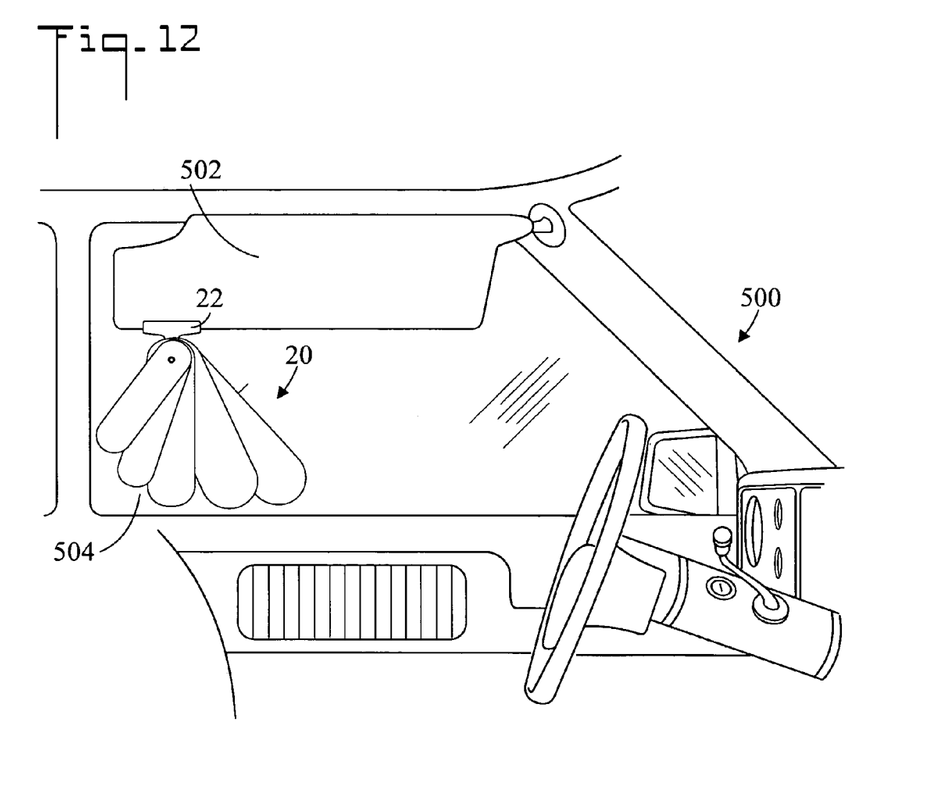
FIG. 12 is a reduced side elevation view of the sun shield in a fanned configuration for blocking glare from a body part of an occupant of the vehicle.

FIG. 12 is a reduced side elevation view of sun shield 20 in a fanned configuration for blocking glare from a body part of an occupant of vehicle 500. In the fanned configuration, sun shield 20 can block a large area of glare 600 which would otherwise impinge upon an arm, hand, leg, face, or body of the occupant of vehicle 500.

Figure 13:
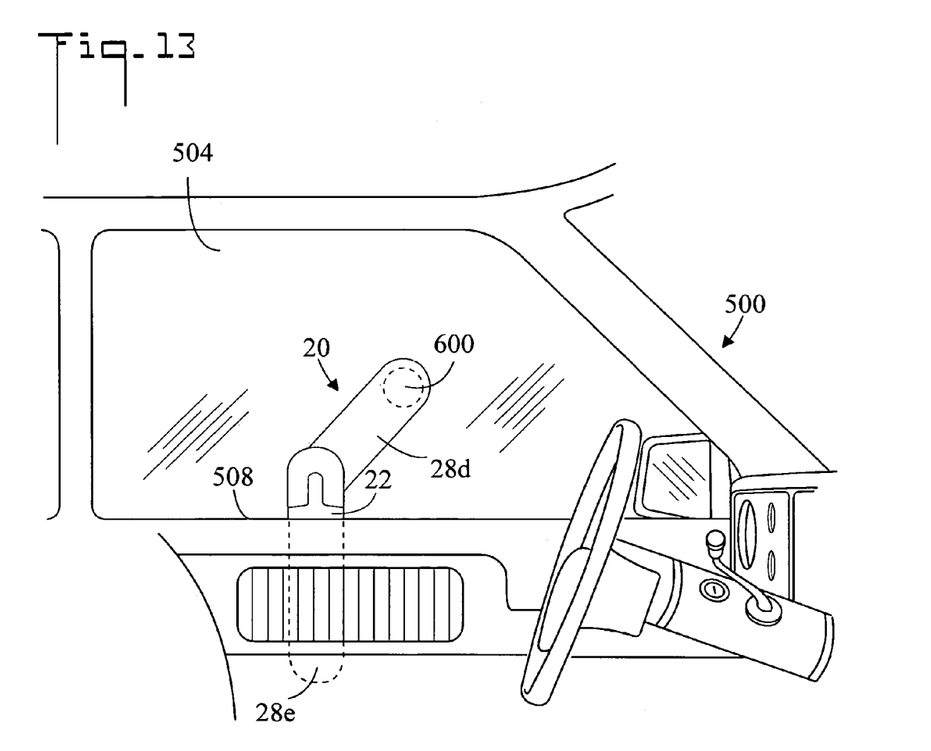
FIG. 13 is a reduced side elevation view of the sun shield installed between the side window and weather-stripping.

FIG. 13 is a reduced side elevation view of sun shield 500 installed between side window 504 and side window weather-stripping 508. In the shown embodiment four anchor blades (28a through 28d) have been inserted down between side window 504 and weather-stripping 508. In this embodiment, connector 22 is not utilized, but rather at least one anchor blade 28 is inserted between side window 504 and weather-stripping 508 to anchor sun shield 20. By inserting four anchor blades 28 between side window 504 and weather-stripping 508, a tighter fit is obtained.

Figure 14:
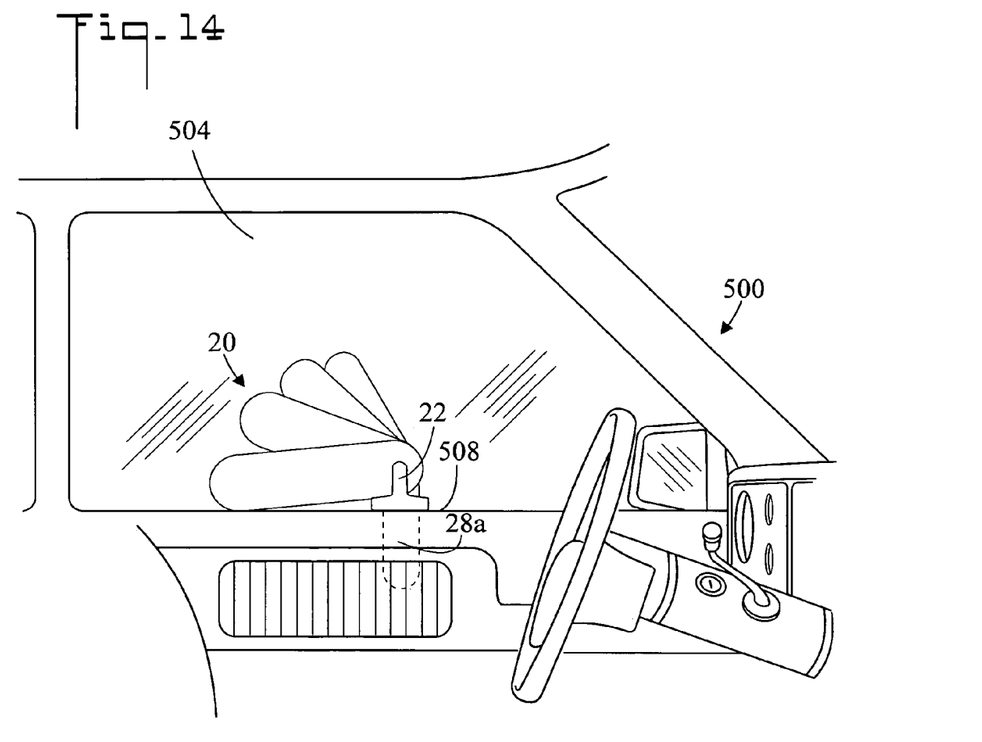
FIG. 14 is a reduced side elevation view of the sun shield installed between the side window and weather-stripping in a fanned configuration.

FIG. 14 is a reduced side elevation view of sun shield 20 installed between side window 504 and weather-stripping 508 with the sun shield 20 in a fanned configuration. Blade 28a has been inserted between side window 504 and weather-stripping 508 to anchor sun shield 20. As with FIG. 13, this configuration is useful in protecting body parts of the occupant from glare 600.

Figure 15:
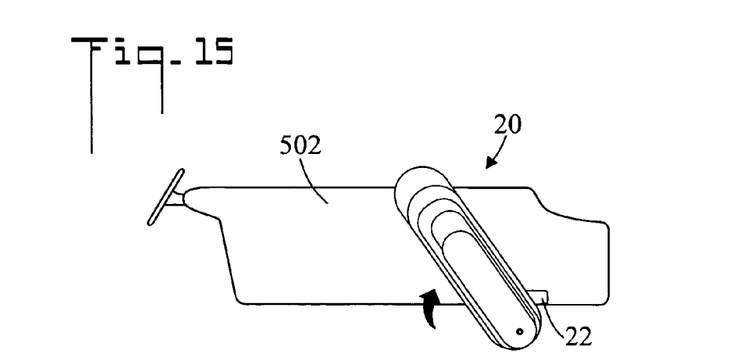
FIG. 15 is a reduced front elevation view of the sun shield placed in a stored configuration; and, FIG. 16 is a front elevation view of the sun shield.

FIG. 15 is a reduced front elevation view of sun shield 20 placed in a stored configuration. In this embodiment hen not in use sun shield 20 is left attached to visor 502. The blades of sun shield 20 are rotated so as not to obstruct the view of the occupant.

Figure 16:
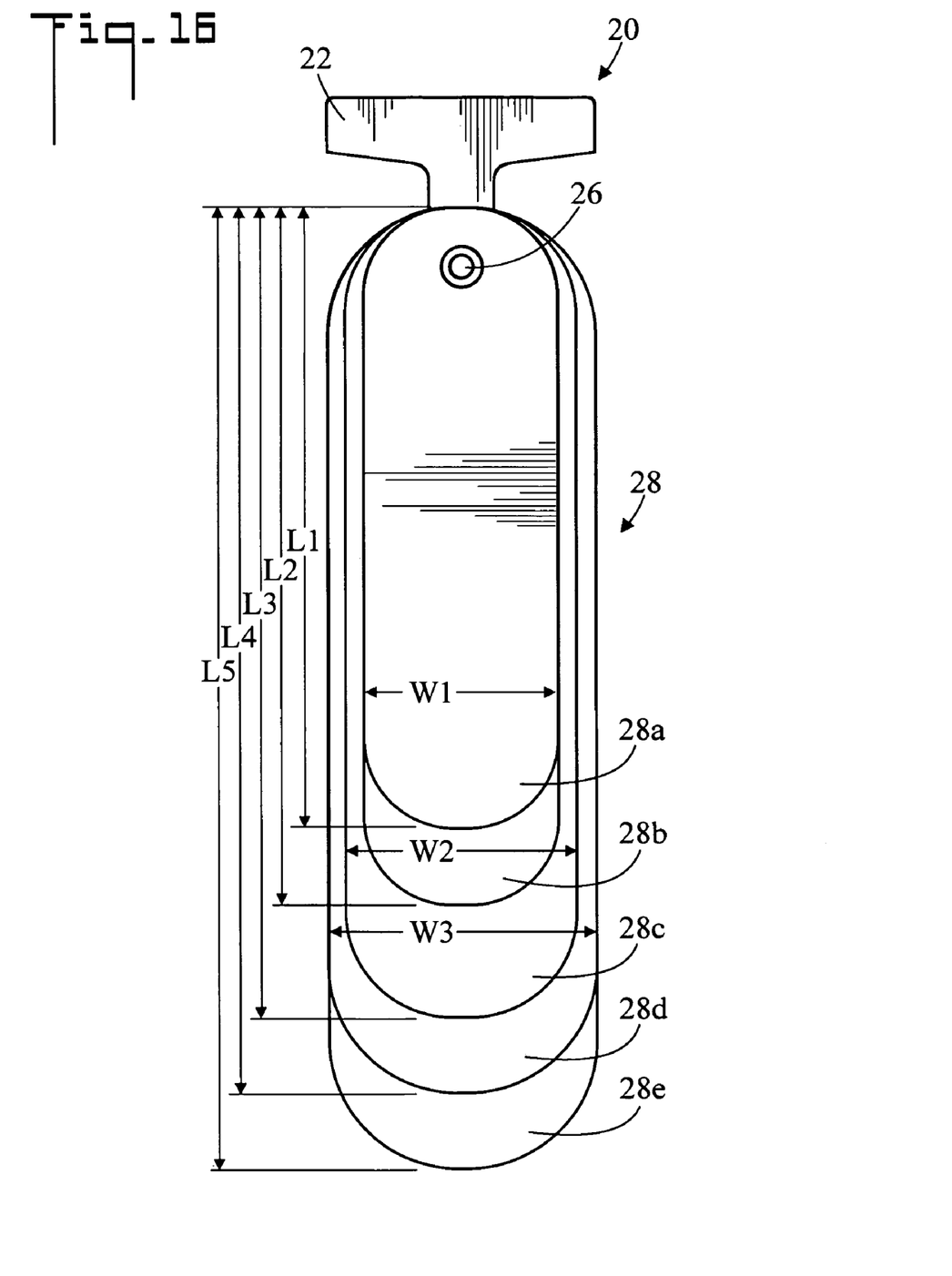

FIG. 16 is a front elevation view of sun shield 20. Plurality of blades 28 includes five blades as follows:
- a first blade 28a having a length L1 and a width W1;
- a second blade 28b having a length L2 and a width W1;
- a third blade 28c having a length L3 and a width W2;
- a fourth blade 28d having a length L4 and a width W3;
- a fifth blade 28e having a length L5 and a width W3;
- wherein L1<L2<L3<L4<L5, and W1<W2<W3.

The above cited combination of lengths and widths has been found very useful in providing the occupant with the capability of selecting a blade 28 which both blocks the glare 600 from the sun and also minimizes the viewing obstruction present by the selected blade 28. That is, the occupant can select the blade size which is just sufficient to block the glare 600 from the sun.

In terms of use, a method for the occupant of a vehicle to block glare 600 from the sun, comprises:
(a) providing a vehicle 500 having a visor 502;
(b) providing a sun shield 20 which is attachable to visor 502 of vehicle 500, sun shield 20 including: (refer to FIG. 5)
    a clamp 22 for selectively attaching sun shield 22 to a desired location on visor 502 of vehicle 500;
    a swivel 26 attached to clamp 22;
    a plurality of blades 28 pivotally attached to swivel 26, wherein each of the plurality of blades 28 is rotationally positionable about swivel 26;
    the plurality of blades 28 including (1) blades 28 of different lengths, and (2) blades 28 of different widths;

(c) the occupant using clamp 26 to attach sun shield 20 to a desired location on visor 502 of vehicle 500; It is noted that sun shield 20 may be attached to various locations on visor 502 (refer to FIG. 7)

(d) the occupant selecting one blade 28 from the plurality of blades 28, wherein the selection is made so that the length and width of the selected blade 28 will both (1) block glare from the sun 600, and (2) minimize an amount of viewing obstruction presented to the occupant by the selected blade 28. That is, the occupant chooses the blade 28 which has a width and length which is just sufficient to block the glare 600 from the sun, but which presents a minimum viewing obstruction. For example, in FIG. 8 blade 28a was selected because it both (1) blocks the glare 600 from the sun and also presents the minimum viewing obstruction to the occupant. One of the other four wider and longer blades 28 could also block the glare 600 from the sun, however these larger blades 28 would present a larger viewing obstruction to the occupant.

(e) the occupant rotating the selected blade 28 so that the selected blade 28 blocks glare 600 from the sun.

The method further including: (refer to FIG. 16)

in (b), the plurality of blades 28 including five blades as follows:
  a first blade 28a having a length L1 and a width W1;
  a second blade 28b having a length L2 and a width W1;
  a third blade 28c having a length L3 and a width W2;
  a fourth blade 28d having a length L4 and a width W3;
  a fifth blade 28e having a length L5 and a width W3;
  wherein L1<L2<L3<L4<L5, and W1<W2<W3;

in (b), the five blades 28 each having a racetrack shape; and, in (d), the selecting including choosing one of (1) first blade 28a, (2) second blade 28b, (3) third blade 28c, (4) fourth blade 28d, and (5) fifth blade 28e.

The method further including:

in (b), L1 being about eight inches, L5 being about 13 inches, W1 being about three inches, and W3 being about four inches.

A second method for the occupant of a vehicle to block glare 600 from the sun includes: (refer also to FIG. 9)

(a) providing a vehicle 50 having a visor 502 which is selectively positionable to a lowered position (as shown in FIG. 9), visor 502 having a proximal edge 503 having a length L, and a distal edge 505;

(b) providing a sun shield 20 which is attachable to visor 502 of vehicle 500, sun shield 20 including:
  a clamp 22 for selectively attaching sun shield 20 to a desired location on visor 502 of vehicle 500;
  a swivel 26 attached to clamp 22;
  a plurality of blades 28 pivotally attached to swivel 26, wherein each of the plurality of blades 28 is rotationally positionable about swivel 26;
  the plurality of blades 28 including (1) blades 28 of different lengths, and (2) blades 28 of different widths;

(c) the occupant placing visor 502 in the lowered position;

(d) the occupant using clamp 22 to attach sun shield 20 to a desired location anywhere along length of proximal edge 503 of visor 502;

(e) the occupant selecting one blade 28 from the plurality of blades 28 wherein the selection is made so that the length and width of the selected blade 28 will both (1) block glare from the sun, and (2) minimize an amount of viewing obstruction presented to the occupant by the selected blade 28; and, (f) the occupant rotating the selected blade 28 so that the selected blade 28 extends beyond distal edge 505 of visor 502 and blocks glare 600 from the sun.

The method further including:

in (b), the plurality of blades 28 including five blades 28 as follows:
  a first blade 28a having a length L1 and a width W1;
  a second blade 28b having a length L2 and a width W1;
  a third blade 28c having a length L3 and a width W2;
  a fourth blade 28d having a length L4 and a width W3;
  a fifth blade 28e having a length L5 and a width W3;
  wherein L1<L2<L3<L4<L5, and W1<W2<W3;

in (b), the five blades 28 each having a racetrack shape; and, in (e), the selecting including choosing one of (1) first blade 28a, (2) second blade 28b, (3) third blade 28c, (4) fourth blade 28d, and (5) fifth blade 28e.

The method further including:

in (b), L1 being about eight inches, L5 being about 13 inches, W1 being about three inches, and W3 being about four inches.

A third method for the occupant of a vehicle to block glare 600 from the sun includes: (also refer to FIG. 13)

(a) providing a vehicle 500 having a side window 504 and cooperating weather-stripping 508;

(b) providing a sun shield 20 including:
  a clamp 22 for selectively attaching sun shield 20 to a desired location on vehicle 500;
  a swivel 26 attached to clamp 22;
  a plurality of blades 28 pivotally attached to swivel 26, wherein each of the plurality of blades 28 is rotationally positionable about swivel 26;
  the plurality of blades 28 including (1) blades 28 of different lengths, and (2) blades 28 of different widths;

(c) the occupant selecting at least one anchor blade 28 from the plurality of blades 28 and inserting the at least one anchor blade 28 between side window 504 and weather-stripping 508 so that the at least one anchor blade 28 is fixedly captured therebetween. In FIG. 13, blades 28a through 28c and 28e have been selected as the anchor blades 28.

(d) the occupant selecting a blocking blade 28 from the plurality of blades 28, wherein the selection is made so that said length and width of blocking blade 28 will both (1) block glare from the sun, and (2) minimize an amount of viewing obstruction presented to the occupant by blocking blade 28. In FIG. 13, blade 28d has been selected as the blocking blade 28.

(e) the occupant rotating blocking blade 28 so that blocking blade 28 blocks glare 600 from the sun.

The method further including:

in (b), the plurality of blades 28 including five blades 28 as follows:
  a first blade 28a having a length L1 and a width W1;
  a second blade 28b having a length L2 and a width W1;
  a third blade 28c having a length L3 and a width W2;
  a fourth blade 28d having a length L4 and a width W3;
  a fifth blade 28e having a length L5 and a width W3;
  wherein L1<L2<L3<L4<L5, and W<W2<W3;

in (b), the five blades 28 each having a racetrack shape;

in (c), the selecting including choosing at least one of (1) first blade 28a, (2) second blade 28b, (3) third blade 28c, (4) fourth blade 28d, and (5) fifth blade 28e; and, in (d), the selecting including choosing one of (1) first blade 28a, (2) second blade 28b, (3) third blade 28c, (4)

fourth blade 28*d*, and (5) fifth blade 28*e*, wherein said at least one blade 28 that was selected in (c) cannot be selected in (d).

The method further including:

in (b), L1 being about eight inches, L5 being about 13 inches, W1 being about three inches, and W3 being about four inches.

The method further including:

in (c), selecting four anchor blades 28 and inserting all four selected anchor blades 28 between side window 504 and weather-stripping 508.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A method for the occupant of a vehicle to block glare from the sun, comprising:
    (a) providing a vehicle having a side window and cooperating weather-stripping;
    (b) providing a sun shield including:
        a clamp for selectively attaching said sun shield to a desired location on said vehicle;
        a swivel attached to said clamp;
        a plurality of blades pivotally attached to said swivel, wherein each of said plurality of blades is rotationally positionable about said swivel;
        said plurality of blades including (1) blades of different lengths, and (2) blades of different widths;
    (c) the occupant selecting at least one anchor blade from said plurality of blades and inserting said at least one anchor blade between said side window and said weather-stripping so that said at least one anchor blade is fixedly captured therebetween;
    (d) the occupant selecting a blocking blade from said plurality of blades, wherein said selection is made so that said length and width of said blocking blade will both (1) block glare from the sun, and (2) minimize an amount of viewing obstruction presented to the occupant by said blocking blade; and,
    (e) the occupant rotating said blocking blade so that said blocking blade blocks glare from the sun.

2. The method of claim 1, further including:
    in (b), said plurality of blades including five blades as follows:
        a first blade having a first length and a first width;
        a second blade having a second length and the first width;
        a third blade having a third length and a second width;
        a fourth blade having a fourth length and a third width;
        a fifth blade having a fifth length L5 and the third width W3;
        wherein said first length is less than said second length, said second length is less than said third length, said third length is less than said fourth length, and said fourth length is less than said fifth length;
    in (b), said five blades each having a racetrack shape;
    in (c), said selecting including choosing at least one of (1) said first blade, (2) said second blade, (3) said third blade, (4) said fourth blade, (5) said fifth blade; and,
    in (d), said selecting including choosing one of (1) said first blade, (2) said second blade, (3) said third blade, (4) said fourth blade, (5) said fifth blade, wherein said at least one blade that was selected in (c) cannot be selected in (d).

3. The method of claim 2, further including:
    in (b), said first length being about eight inches, said fifth length being about 13 inches, said first width being about three inches, and said third width being about four inches.

4. The method of claim 2, further including:
    in (c), selecting four said anchor blades and inserting all four selected anchor blades between said side window and said weather-stripping.

* * * * *